(12) United States Patent
Liu et al.

(10) Patent No.: US 10,009,252 B2
(45) Date of Patent: Jun. 26, 2018

(54) FLOW ENTRY DELIVERY METHOD AND COMMUNICATION SYSTEM

(71) Applicant: Huawei Technologies Co., Ltd., Shenzhen, Guangdong (CN)

(72) Inventors: Hongkuan Liu, Hangzhou (CN); Weifeng Shen, Hangzhou (CN); Xiuchu Zhao, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 15/166,954

(22) Filed: May 27, 2016

(65) Prior Publication Data
US 2016/0277280 A1 Sep. 22, 2016

Related U.S. Application Data

(63) Continuation of application No. PCT/CN2013/088140, filed on Nov. 29, 2013.

(51) Int. Cl.
*H04L 12/751* (2013.01)
*H04L 12/64* (2006.01)
(Continued)

(52) U.S. Cl.
CPC .......... *H04L 45/02* (2013.01); *H04L 12/6418* (2013.01); *H04L 45/26* (2013.01);
(Continued)

(58) Field of Classification Search
CPC ......... H04L 45/02; H04L 45/42; H04L 45/64; H04L 45/74; H04L 45/26; H04L 12/6418; H04L 45/38
See application file for complete search history.

(56) References Cited

U.S. PATENT DOCUMENTS

| 2011/0317559 A1 | 12/2011 | Kern et al. |
| 2012/0201140 A1* | 8/2012 | Suzuki ............... H04L 45/22 370/235 |

(Continued)

FOREIGN PATENT DOCUMENTS

| CN | 102685006 A | 9/2012 |
| CN | 102938794 A | 2/2013 |

(Continued)

OTHER PUBLICATIONS

"OpenFlow Switch Specification", Open Networking Foundation, Version 1.4.0 (Wire Protocol 0x05), Oct. 14, 2013, 206 pages.

*Primary Examiner* — Phuc Tran (57) ABSTRACT

A flow entry delivery method and a communication system are provided. The communication system includes a controller and N switches. After receiving a packet-in message sent by a source switch, the controller determines a forwarding path for forwarding to-be-forwarded data. Then, the controller generates a corresponding flow entry for each of the N switches in the forwarding path separately, and generates a corresponding control instruction for each of other N−1 switches except the source switch in the forwarding path separately. After encapsulating the generated N flow entries and N−1 control instructions into the $N^{th}$ command packet, the controller sends the $N^{th}$ command packet to the $N^{th}$ switch of the N switches, so that the $N^{th}$ switch transmits the N flow entries in the forwarding path according to the $N^{th}$ control instruction in the $N^{th}$ command packet.

13 Claims, 5 Drawing Sheets

(51) Int. Cl.
*H04L 12/721* (2013.01)
*H04L 12/741* (2013.01)
*H04L 12/715* (2013.01)
*H04L 12/717* (2013.01)

(52) U.S. Cl.
CPC .............. *H04L 45/42* (2013.01); *H04L 45/64* (2013.01); *H04L 45/74* (2013.01); *H04L 45/38* (2013.01)

(56) References Cited

U.S. PATENT DOCUMENTS

| | | | |
|---|---|---|---|
| 2012/0246637 A1* | 9/2012 | Kreeger | H04L 67/1038 718/1 |
| 2013/0151685 A1 | 6/2013 | Bursell | |
| 2014/0226661 A1* | 8/2014 | Mekkattuparamban | H04L 45/74 370/392 |
| 2014/0241368 A1* | 8/2014 | Suzuki | H04L 12/66 370/392 |

FOREIGN PATENT DOCUMENTS

| | | |
|---|---|---|
| CN | 103036653 A | 4/2013 |
| CN | 103346969 A | 10/2013 |
| CN | 103401726 A | 11/2013 |
| CN | 103401784 A | 11/2013 |
| WO | 2013/099080 A1 | 7/2013 |

* cited by examiner

FLOW ENTRY DELIVERY METHOD AND COMMUNICATION SYSTEM

CROSS-REFERENCE TO RELATED APPLICATIONS

This application is a continuation of International Application No. PCT/CN2013/088140, filed on Nov. 29, 2013, which is hereby incorporated by reference in its entirety.

TECHNICAL FIELD

The present invention relates to the field of network communications technologies, and in particular, to a flow entry delivery method and a communication system.

BACKGROUND

With arrival of a big data era, users have higher requirements for a data transmission capability of a network.

In a traditional data transport network, a switch is primarily used for forwarding data. After the switch receives data sent by an upper-level device, the switch itself determines a forwarding path of the data, and then forwards the data to a lower-level device along the forwarding path. However, in the foregoing forwarding manner, each switch needs to perform the step of determining a forwarding path, and therefore, the switch needs to process a large amount of data in an entire data forwarding process. In addition, because each switch is unable to learn an overall topology of the network when determining the forwarding path, the determined forwarding path is not an optimal forwarding path.

Therefore, an OpenFlow technology is put forward in the prior art. In the OpenFlow technology, one controller is used to control all switches in a network. A switch is only responsible for data forwarding. A forwarding path is determined by the controller. Because the controller can learn an overall topology of the network, a better forwarding path can be determined. In addition, the step of determining the forwarding path is performed by the controller, thereby reducing workload of the switch and improving data forwarding efficiency of the switch.

Figure 1:
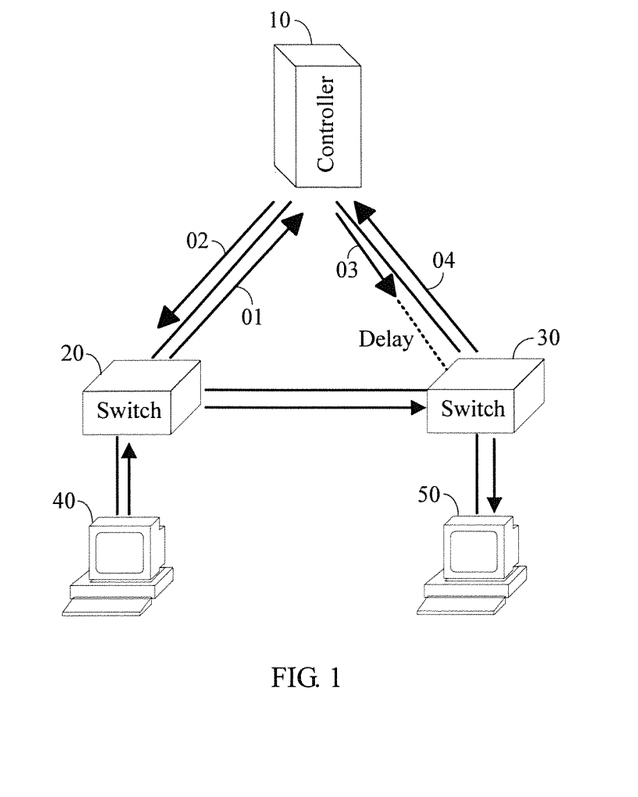
FIG. 1 is a schematic diagram of delivering a control instruction in the prior art.

In the OpenFlow technology, after determining a forwarding path of data, the controller needs to deliver the forwarding path by means of a control instruction to a switch involved in the forwarding path. FIG. 1 is a schematic diagram of delivering a control instruction in the prior art. As shown in FIG. 1, when a terminal 40 needs to send data to a terminal 50 by using a network, the terminal 40 sends the to-be-sent data to a switch 20 first. After receiving the data sent by the terminal 40, the switch 20 needs to send a packet-in message 01 to a controller 10. After receiving the Packet-in message and determining a forwarding path for the to-be-sent data, the controller 10 may send a flow table modification command (for example, Flow mod) to generate a flow entry, where the Flow mod includes forwarding path information; and then send the Flow mod in a form of a packet-out message to all switches involved in the forwarding path. In FIG. 1, all the switches involved in the forwarding path are a switch 20 and a switch 30. The controller 10 sends a packet-out message 02 and a packet-out message 03 to the switch 20 and a switch 30 respectively. Because different delays generally exist on different network connections, it cannot be ensured that the packet-out message 02 and the packet-out message 03 reach the switch 20 and the switch 30 simultaneously. When a longer delay exists on a connection between the switch 30 and the controller 10, time when the packet-out message 03 is received by the switch 30 is later than time when the packet-out message 02 is received by the switch 20. However, the switch 20 sends the data to the switch 30 as soon as the packet-out message 02 is received. At this time, because the switch 30 has not received the packet-out message 03 and is unable to determine a forwarding path of the received data, the switch 30 further sends a packet-in message 04 to the controller 10. After receiving the packet-in message 04, the controller 10 sends a packet-out message (not shown in FIG. 1) to the switch 30 again.

From the foregoing description, it can be learned that once a delay is generated in delivery of the packet-out message 03 by the controller 10 to the switch 30, the switch 30 needs to send the packet-in message 04 additionally, and the controller 10 further sends a packet-out message to the switch 30 additionally. The two messages are redundant and increase an amount of data that needs to be processed by the controller and the switch. In addition, the forwarding path in the packet-out message sent by the controller 10 to the switch 30 additionally may be inconsistent with the forwarding path in the packet-out message 03 that arrives at the switch 30 after the delay. In this case, the switch 30 may have a logic error and fail to complete data forwarding correctly.

In summary, according to a method for delivering a flow entry in a forwarding path in the prior art, once a delay occurs in a delivery process, a corresponding device may send a redundant message, or even a logic error occurs, which leads to an error in a data forwarding process.

SUMMARY

In view of the foregoing, the present invention provides a flow entry delivery method and a communication system to solve a problem that a device sends a redundant message or even an error occurs in a data forwarding process because a delay occurs in a process of delivering a flow entry in a forwarding path. The specific solutions are as follows:

According to a first possible implementation manner of a first aspect of this application, this application provides a flow entry delivery method, where the method includes:

receiving, by a controller, a packet-in message sent by a source switch;

determining a forwarding path according to the packet-in message;

generating a corresponding flow entry for each of N switches in the forwarding path separately, where the $1^{st}$ switch in the N switches is the source switch, the $N^{th}$ switch is a target switch in the forwarding path, the $M^{th}$ switch is the $M^{th}$-hop switch in the forwarding path, $1<M\leq N$, and a flow entry corresponding to the $M^{th}$ switch is the $M^{th}$ flow entry;

generating a corresponding control instruction for each of other N−1 switches except the source switch in the forwarding path separately, where a control instruction corresponding to the $M^{th}$ switch is the $M^{th}$ control instruction;

encapsulating the generated N flow entries and N−1 control instructions into the $N^{th}$ command packet; and sending the $N^{th}$ command packet to the $N^{th}$ switch, so that the $N^{th}$ switch transmits the N flow entries in the forwarding path according to the $N^{th}$ control instruction in the $N^{th}$ command packet, where the $M^{th}$ control instruction in the $M^{th}$ command packet is used to instruct the $M^{th}$ switch to store the $M^{th}$ flow entry, encapsulate all flow entries and control instructions except the $M^{th}$ flow entry and the $M^{th}$ control instruction in the $M^{th}$ command packet into the $(M-1)^{th}$ command packet, and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

With reference to a second possible implementation manner of the first aspect, the sending the $N^{th}$ command packet to the $N^{th}$ switch specifically includes:

when a control signaling transmission link exists between the controller and the $N^{th}$ switch, sending the $N^{th}$ command packet to the $N^{th}$ switch directly by using the control signaling transmission link; or when a control signaling transmission link does not exist between the controller and the $N^{th}$ switch, sending the $N^{th}$ command packet to the $N^{th}$ switch by using the source switch and the forwarding path.

With reference to either of the two possible implementation manners of the first aspect, a method for generating the $M^{th}$ control instruction specifically includes:

determining the $(M-1)^{th}$ switch;

determining address information of the $(M-1)^{th}$ switch;

determining a port used when the $M^{th}$ switch sends the $N^{th}$ command packet to the $(M-1)^{th}$ switch; and generating the $M^{th}$ control instruction that includes the address information of the $(M-1)^{th}$ switch and information about the port, so that the $M^{th}$ switch encapsulates the address information of the $(M-1)^{th}$ switch into the $(M-1)^{th}$ command packet according to the $M^{th}$ control instruction and sends the $(M-1)^{th}$ command packet to the $(M-1)^{th}$ switch by using the port.

According to a first possible implementation manner of a second aspect of this application, this application provides a flow entry delivery method, where the method includes:

receiving, by the $M^{th}$ switch, the $M^{th}$ command packet, where the $M^{th}$ command packet includes at least the $1^{st}$ to the $M^{th}$ flow entries that amount to M flow entries and the $2^{nd}$ to the $M^{th}$ control instructions that amount to M−1 control instructions, where the $M^{th}$ switch is the $M^{th}$-hop switch in a forwarding path, $1<M\leq N$, the forwarding path is a path determined by a controller and used to forward to-be-forwarded data, the forwarding path includes N switches, a control instruction corresponding to the $M^{th}$ switch is the $M^{th}$ control instruction, and a flow entry corresponding to the $M^{th}$ switch is the $M^{th}$ flow entry;

storing the $M^{th}$ flow entry; and executing the $M^{th}$ control instruction, to encapsulate all flow entries and control instructions except the $M^{th}$ flow entry and the $M^{th}$ control instruction in the $M^{th}$ command packet into the command packet and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

With reference to a second possible implementation manner of the second aspect, the receiving, by the $M^{th}$ switch, the $M^{th}$ command packet specifically includes:

when the $M^{th}$ switch is a target switch in the forwarding path, receiving, by the $M^{th}$ switch, the $M^{th}$ command packet sent by the controller; or when the $M^{th}$ switch is not a target switch in the forwarding path, receiving, by the $M^{th}$ switch, the $M^{th}$ packet sent by the $(M+1)^{th}$ switch, where the $(M+1)^{th}$ switch is a next-hop switch of the $M^{th}$ switch in the forwarding path.

According to a first possible implementation manner of a third aspect of this application, this application provides a controller, where the controller includes:

a receiving unit, configured to receive a packet-in message sent by a source switch;

a processing unit, configured to determine a forwarding path according to the packet-in message, where the processing unit is further configured to generate a corresponding flow entry for each of N switches in the forwarding path separately, where the $1^{st}$ switch in the N switches is the source switch, the $N^{th}$ switch is a target switch in the forwarding path, the $M^{th}$ switch is the $M^{th}$-hop switch in the forwarding path, $1<M\leq N$, and a flow entry corresponding to the $M^{th}$ switch is the $M^{th}$ flow entry; and the processing unit is further configured to generate a corresponding control instruction for each of other N−1 switches except the source switch in the forwarding path separately, where a control instruction corresponding to the $M^{th}$ switch is the $M^{th}$ control instruction;

an encapsulating unit, configured to encapsulate the generated N flow entries and N−1 control instructions into the $N^{th}$ command packet; and a sending unit, configured to send the $N^{th}$ command packet to the $N^{th}$ switch, where the $M^{th}$ control instruction in the $M^{th}$ command packet is used to instruct the $M^{th}$ switch to store the $M^{th}$ flow entry, encapsulate all flow entries and control instructions except the $M^{th}$ flow entry and the $M^{th}$ control instruction in the $M^{th}$ command packet into the $(M-1)^{th}$ command packet, and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

With reference to a second possible implementation manner of the third aspect, the sending unit specifically includes:

a first sending subunit, configured to: when a control signaling transmission link exists between the controller and the switch, send the $N^{th}$ command packet to a target switch by using the control signaling transmission link directly; and a second sending subunit, configured to: when the control signaling transmission link does not exist between the controller and the $N^{th}$ switch, send the $N^{th}$ command packet to the $N^{th}$ switch by using the source switch.

With reference to either of the two possible implementation manners of the third aspect, the processing unit specifically includes:

a first determining subunit, configured to determine the $(M-1)^{th}$ switch;

a second determining subunit, configured to determine address information of the $(M-1)^{th}$ switch;

a third determining subunit, configured to determine a port used when the $M^{th}$ switch sends the $M^{th}$ command packet to the $(M-1)^{th}$ switch; and a first control instruction generating subunit, configured to generate the $M^{th}$ control instruction that includes the address information of the $(M-1)^{th}$ switch and information about the port, so that the $M^{th}$ switch encapsulates the address information of the $(M-1)^{th}$ switch into the $(M-1)^{th}$ command packet according to the $M^{th}$ control instruction and sends the $(M-1)^{th}$ command packet to the $(M-1)^{th}$ switch by using the port.

According to a first possible implementation manner of a fourth aspect of this application, this application provides a switch, where the switch includes:

a receiving unit, configured to receive the $M^{th}$ command packet, where the $M^{th}$ command packet includes at least the $1^{st}$ to the $M^{th}$ flow entries that amount to M flow entries and the $2^{nd}$ to the $M^{th}$ control instructions that amount to M−1 control instructions, where the switch is the $M^{th}$ switch, the $M^{th}$ switch is the $M^{th}$-hop switch in a forwarding path, 1<M≤N, the forwarding path is a path determined by a controller and used to forward to-be-forwarded data, the forwarding path includes N switches, a control instruction corresponding to the $M^{th}$ switch is the $M^{th}$ control instruction, and a flow entry corresponding to the $M^{th}$ switch is the $M^{th}$ flow entry;

a processing unit, configured to store the $M^{th}$ flow entry; and a sending unit, configured to execute the $M^{th}$ control instruction, to encapsulate all flow entries and control instructions except the $M^{th}$ flow entry and the $M^{th}$ control instruction in the $M^{th}$ command packet into the $(M-1)^{th}$ command packet and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

With reference to a second possible implementation manner of the fourth aspect, the receiving unit specifically includes:

a first receiving subunit, configured to: when the $M^{th}$ switch is a target switch in the forwarding path, receive the $M^{th}$ command packet sent by the controller; and a second receiving subunit, configured to: when the $M^{th}$ switch is not the target switch in the forwarding path, receive the $M^{th}$ packet sent by the $(M+1)^{th}$ switch, where the $(M+1)^{th}$ switch is a next-hop switch of the $M^{th}$ switch in the forwarding path.

According to a first possible implementation manner of a fifth aspect of this application, this application provides a computing node, including a processor, a communications interface, a memory, and a bus, where the processor, the communications interface, and the memory communicate with each other by using the bus;

the processor is configured to execute a program;

the memory is configured to store the program; and when the computing node runs, the processor communicates with the memory, and the processor executes the program so that the computing node performs the following method:

receiving a packet-in message sent by a source switch;

determining a forwarding path according to the packet-in message;

generating a corresponding flow entry for each of N switches in the forwarding path separately, where the $1^{st}$ switch in the N switches is the source switch, the $N^{th}$ switch is a target switch in the forwarding path, the $M^{th}$ switch is the $M^{th}$-hop switch in the forwarding path, 1<M≤N, and a flow entry corresponding to the $M^{th}$ switch is the $M^{th}$ flow entry;

generating a corresponding control instruction for each of other N−1 switches except the source switch in the forwarding path separately, where a control instruction corresponding to the $M^{th}$ switch is the $M^{th}$ control instruction;

encapsulating the generated N flow entries and N−1 control instructions into the $N^{th}$ command packet; and sending the $N^{th}$ command packet to the $N^{th}$ switch, so that the $N^{th}$ switch transmits the N flow entries in the forwarding path according to the $N^{th}$ control instruction in the $N^{th}$ command packet, where the $M^{th}$ control instruction in the $M^{th}$ command packet is used to instruct the $M^{th}$ switch to store the $M^{th}$ flow entry, encapsulate all flow entries and control instructions except the $M^{th}$ flow entry and the $M^{th}$ control instruction in the $M^{th}$ command packet into the $(M-1)^{th}$ command packet, and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path;

According to a sixth aspect of this application, this application provides a computing node, including a processor, a communications interface, a memory, and a bus, where the processor, the communications interface, and the memory communicate with each other by using the bus;

the processor is configured to execute a program;

the memory is configured to store the program; and when the computing node runs, the processor communicates with the memory, and the processor executes the program so that the computing node performs the following method:

receiving the $M^{th}$ command packet, where the $M^{th}$ command packet includes at least the $1^{st}$ to the $M^{th}$ flow entries that amount to M flow entries and the $2^{nd}$ to the $M^{th}$ control instructions that amount to M−1 control instructions, where the $M^{th}$ switch is the $M^{th}$-hop switch in a forwarding path, 1<M≤N, the forwarding path is a path determined by a controller and used to forward to-be-forwarded data, the forwarding path includes N switches, a control instruction corresponding to the $M^{th}$ switch is the $M^{th}$ control instruction, and a flow entry corresponding to the $M^{th}$ switch is the $M^{th}$ flow entry;

storing the $M^{th}$ flow entry; and executing the $M^{th}$ control instruction, to encapsulate all flow entries and control instructions except the $M^{th}$ flow entry and the $M^{th}$ control instruction in the $M^{th}$ command packet into the $(M-1)^{th}$ command packet and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

As seen from the foregoing technical solutions, in the flow entry delivery method and the communication system according to embodiments of the present invention, a control instruction is generated to control a corresponding switch to identify and store a flow entry that is in a received command packet and corresponding to the switch, encapsulate a flow entry and a control instruction corresponding to another switch in the command packet into a new command packet, and send the new command packet to a previous-hop switch in a forwarding path. In this way, the flow entry and the corresponding control instruction can be sent to each switch in the forwarding path successively in reverse order of forwarding order of to-be-forwarded data. Because each switch sends remaining content of a command packet to a previous-hop switch in a form of a new command packet only after storing a flow entry corresponding to the switch itself, it can be ensured that each switch has a flow entry corresponding to the to-be-forwarded data when forwarding the to-be-forwarded data, thereby avoiding sending of a redundant message and even occurrence of a logic error, and preventing an error in a data forwarding process.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention.

Figure 2:
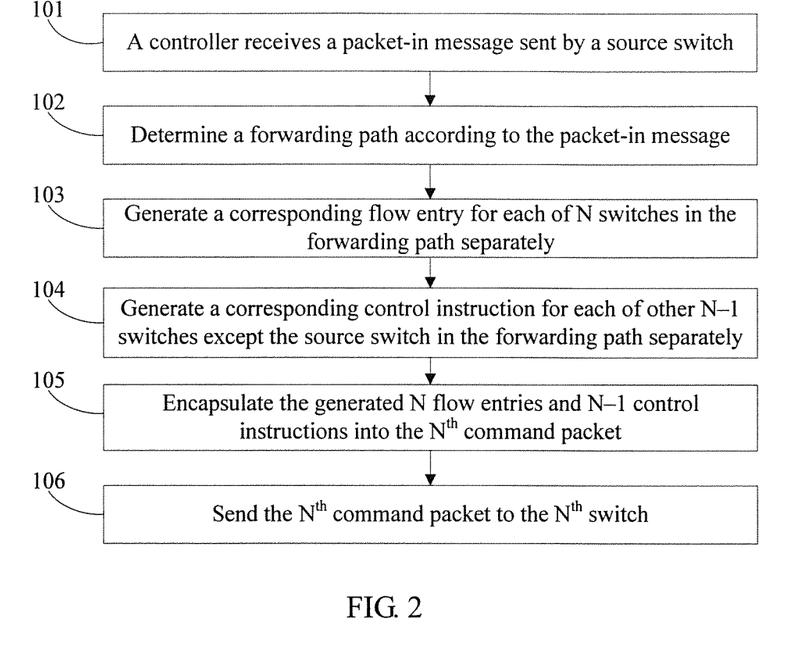
FIG. 2 is a flowchart of Embodiment 1 of a flow entry delivery method according to this application.

FIG. 2 is a flowchart of Embodiment 1 of a flow entry delivery method according to this application. As shown in FIG. 2, the method may include:

Step 101: A controller receives a packet-in message sent by a source switch.

After receiving to-be-forwarded data sent by a terminal (for example, a host), the source switch may send a packet-in message to the controller. The packet-in message indicates that the source switch receives the to-be-forwarded data sent by the terminal, and requires the controller to determine a forwarding path of the to-be-forwarded data.

In an OpenFlow technology, the packet-in message may be encapsulated in a packet in format.

Step 102: Determine a forwarding path according to the packet-in message.

The forwarding path may be a route for forwarding the to-be-forwarded data. Subsequently, switches on a network may forward the to-be-forwarded data successively along the route.

The forwarding path includes switches involved in a forwarding process of the to-be-forwarded data and first order of forwarding the to-be-forwarded data among the switches.

A manner of determining the forwarding path may be based on the prior art, and is not repeated herein.

Step 103: Generate a corresponding flow entry for each of N switches in the forwarding path separately, where the $1^{st}$ switch in the N switches is the source switch, the $N^{th}$ switch is a target switch in the forwarding path, the $M^{th}$ switch is the $M^{th}$-hop switch in the forwarding path, $1<M\le N$, and a flow entry corresponding to the $M^{th}$ switch is the $M^{th}$ flow entry.

The flow entry is used to indicate a port used when a corresponding switch forwards the to-be-forwarded data.

In the OpenFlow technology, the controller may generate a corresponding flow entry for each switch in the forwarding path. After receiving the flow entry, the switch may add the flow entry to a corresponding flow table. Subsequently, after receiving to-be-forwarded data sent by a previous-hop switch, the switch may determine, according to the flow entry, a port for sending the to-be-forwarded data. Because different ports are connected to different switches, the to-be-forwarded data can be sent to a corresponding switch in the forwarding path by using a port specified in the flow entry. Each switch forwards the to-be-forwarded data according to a flow entry stored in the switch, and finally, the to-be-forwarded data can be sent to a target terminal along the forwarding path.

Step 104: Generate a corresponding control instruction for each of other N-1 switches except the source switch in the forwarding path separately, where a control instruction corresponding to the $M^{th}$ switch is the $M^{th}$ control instruction.

Specifically, all flow entries and control instructions may be totally encapsulated into a command packet in step 105.

The $M^{th}$ control instruction in the $M^{th}$ command packet is used to instruct the $M^{th}$ switch to store the $M^{th}$ flow entry, encapsulate all flow entries and control instructions except the $M^{th}$ flow entry and the $M^{th}$ control instruction in the $M^{th}$ command packet into the $(M-1)^{th}$ command packet, and send the encapsulated packet to the $(M-1)^{th}$ switch, so that the $(M-1)^{th}$ switch transmits remaining M-1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

The control instruction may include address information of a corresponding switch. The address information may specifically be an IP address. It is assumed that after receiving a first packet, a switch A can identify, from all control instructions, a first control instruction that includes an IP address identical with that of the switch itself, and execute the first control instruction. A process of executing the first control instruction may specifically include:

adding a flow entry corresponding to the switch A to a corresponding flow table for storage; and deleting the first control instruction executed by the switch A and the corresponding flow entry from the first packet, encapsulating a remaining flow entry and control instruction corresponding to another switch into a second packet, and sending the second packet to a next switch (namely, a third switch).

With reference to the foregoing content, it is understandable that the generating the $M^{th}$ control instruction may specifically include:

determining the $(M-1)^{th}$ switch;

determining address information of the $(M-1)^{th}$ switch;

determining a port used when the $M^{th}$ switch sends the $M^{th}$ command packet to the $(M-1)^{th}$ switch; and generating the $M^{th}$ control instruction that includes the address information of the $(M-1)^{th}$ switch and information about the port, so that the $M^{th}$ switch encapsulates the address information of the $(M-1)^{th}$ switch into the $(M-1)^{th}$ command packet according to the $M^{th}$ control instruction and sends the $(M-1)^{th}$ command packet to the $(M-1)^{th}$ switch by using the port.

It should be noted that transmission order of the command packet among the switches is reverse order of transmission order of the to-be-forwarded data among the switches.

Step 105: Encapsulate the generated N flow entries and N-1 control instructions into the $N^{th}$ command packet.

In the OpenFlow technology, the command packet may be encapsulated in a packet out format.

Step 106: Send the $N^{th}$ command packet to the $N^{th}$ switch, so that the $N^{th}$ switch transmits the N flow entries in the forwarding path according to the $N^{th}$ control instruction in the $N^{th}$ command packet.

Because forwarding order of the command packet among switches is reverse order of forwarding order of the to-be-forwarded data in the forwarding path, the controller needs to send the $N^{th}$ command packet to the target switch in the forwarding path. The target switch is the last switch to which the to-be-forwarded data is sent in the forwarding path according to the forwarding order.

In practical application, a control signaling transmission link may exist or may not exist between the controller and the target switch.

When a control signaling transmission link exists between the controller and the target switch, the packet may be sent to the target switch in the forwarding path directly.

When a control signaling transmission link does not exist between the controller and the target switch, the packet may be sent to the target switch in the forwarding path by using the source switch.

Specifically, the packet may be sent to the target switch in the forwarding path by using the source switch in the following way: The source switch sends the $N^{th}$ command packet to a next-hop switch of the source switch in the forwarding path, and after receiving the command packet, the next-hop switch forwards the command packet to a next-hop switch of the next-hop switch until the packet is forwarded to the target switch.

In summary, in this embodiment, a control instruction is generated to control a corresponding switch to identify and store a flow entry that is in a received command packet and corresponding to the switch, encapsulate a flow entry and a control instruction corresponding to another switch in the command packet into a new command packet, and send the new command packet to a previous-hop switch in a forwarding path. In this way, the flow entry and the corresponding control instruction can be sent to each switch in the forwarding path successively in reverse order of forwarding order of to-be-forwarded data. Because each switch sends remaining content of a command packet to a previous-hop switch in a form of a new command packet only after storing a flow entry corresponding to the switch itself, it can be ensured that each switch has a flow entry corresponding to the to-be-forwarded data when forwarding the to-be-forwarded data, thereby avoiding sending of a redundant message and even occurrence of a logic error, and preventing an error in a data forwarding process.

In another aspect, because when the to-be-forwarded data is received, each switch except the first switch in the forwarding path has a flow entry corresponding to the to-be-forwarded data, the switch is not triggered to send a packet-in message to the controller, thereby avoiding a problem that a device sends a redundant message when a delay occurs during delivery in the forwarding path.

Figure 3:
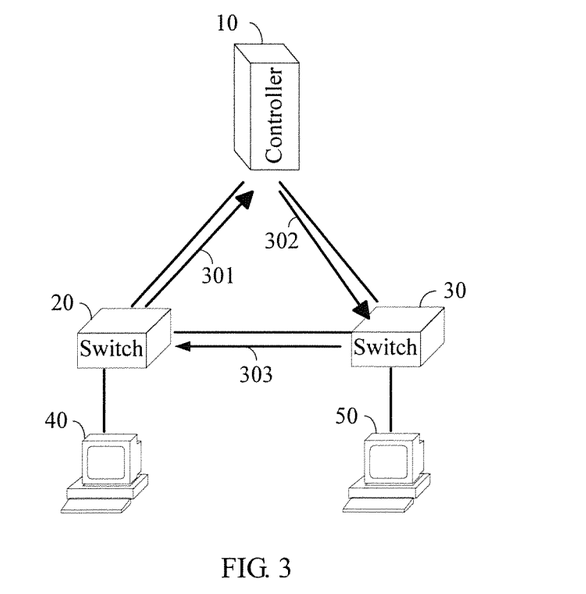
FIG. 3 is a schematic diagram of Embodiment 2 of a flow entry delivery method according to this application.

FIG. 3 is a schematic diagram of Embodiment 2 of a flow entry delivery method according to this application. A network structure in FIG. 3 is the same as that in FIG. 1. After the flow entry delivery method according to this application is used, a signaling interaction process between devices on a network is shown in FIG. 3 and includes:

Step 301: A switch 20 sends a packet-in message to a controller 10.

Step 302: The controller 10 generates a first packet that includes multiple flow entries and control instructions, and sends the first packet to a target switch 30 in a forwarding path.

Step 303: After receiving the first packet, the switch 30 parses the first packet to obtain a flow entry and a control instruction that correspond to an IP address of the switch 30, and stores the flow entry; and encapsulates a remaining flow entry and control instruction of the switch 20 into a second packet, and sends the second packet to the switch 20.

After receiving the second packet, the switch 20 identifies and stores a flow entry corresponding to an IP address of the switch 20 itself, and then may forward to-be-forwarded data.

It can be seen that in this embodiment, because the switch 20 does not forward the to-be-forwarded data before acquiring the corresponding flow entry, even if a delay occurs when the controller 10 sends the first packet to the switch 30, it is avoided that the switch 30 still does not receive the corresponding flow entry when the to-be-forwarded data sent by the switch 20 arrives at the switch 30, thereby ensuring an orderly data forwarding process.

Figure 4:
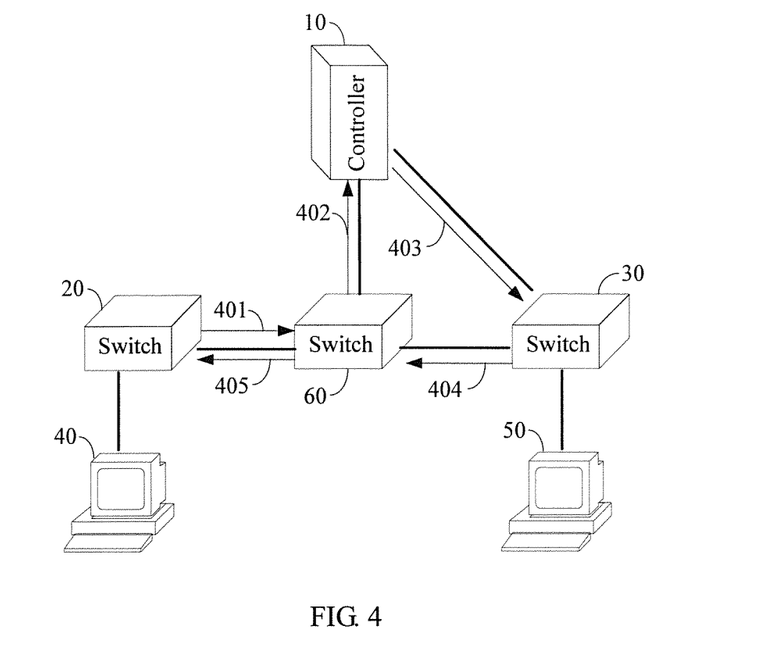
FIG. 4 is a schematic diagram of Embodiment 3 of a flow entry delivery method according to this application.

FIG. 4 is a schematic diagram of Embodiment 3 of a flow entry delivery method according to this application. A forwarding path in FIG. 4 involves 3 switches. In practical application, more switches may be involved in the forwarding path, and this embodiment is described by using an example in which 3 switches are involved. In this embodiment, to-be-forwarded data still needs to be sent from a terminal 40 to a terminal 50. The terminal 40 is still connected to a switch 20 directly, and the terminal 50 is still connected to a switch 30 directly.

After the flow entry delivery method according to this application is used, a signaling interaction process between devices on a network is shown in FIG. 4 and includes:

Step 401: A switch 20 sends a packet-in message to a switch 60.

Because no control signaling transmission link exists between the switch 20 and a controller 10, the packet-in message needs to be sent to the switch 60, and then the switch 60 sends the packet-in message to the controller 10.

Step 402: The switch 60 forwards the packet-in message to a controller 10.

Step 403: The controller 10 generates a first packet that includes multiple flow entries and control instructions, and sends the first packet to a target switch 30 in a forwarding path.

Step 404: After receiving the first packet, the switch 30 parses the first packet to obtain a flow entry and a control instruction that correspond to an IP address of the switch 30, and stores the flow entry; and encapsulates remaining flow entries and control instructions of the switches 20 and 60 into a second packet, and sends the second packet to the switch 60.

Step 405: After receiving the second packet, the switch 60 identifies a flow entry corresponding to an IP address of the switch itself, encapsulates a remaining flow entry and control instruction of the switch 20 into a third packet, and sends the third packet to the switch 20.

After receiving the second packet, the switch 20 identifies and stores the flow entry corresponding to an IP address of the switch 20 itself, and then may forward to-be-forwarded data.

In this embodiment, because a control signaling transmission link exists between the switch 30 and the controller 10, the controller 10 may send the first packet to the target switch 30 directly in step 404.

Figure 5:
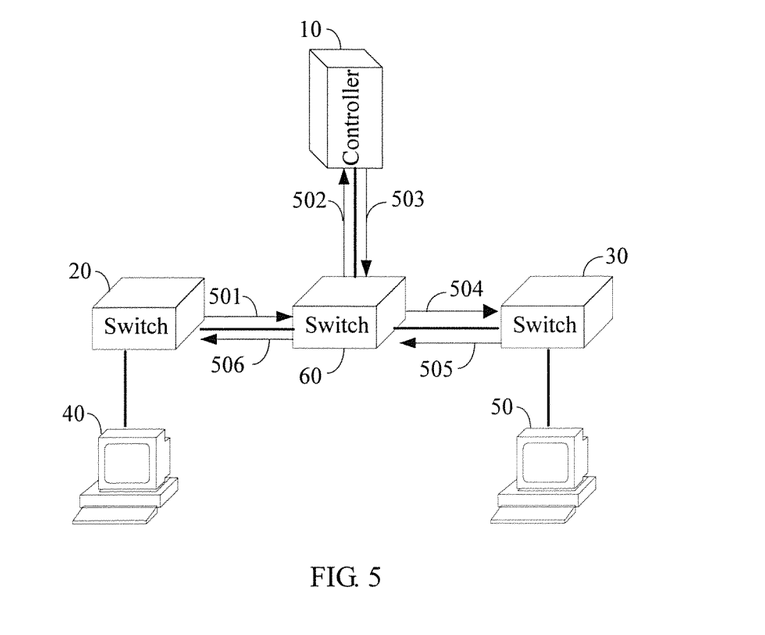
FIG. 5 is a schematic diagram of Embodiment 4 of a flow entry delivery method according to this application.

FIG. 5 is a schematic diagram of Embodiment 4 of a flow entry delivery method according to this application. A network structure in FIG. 5 is basically the same as that in FIG. 4, but differs in that no control signaling transmission link exists between a switch 30 and a controller 10 in FIG. 5.

After the flow entry delivery method according to this application is used, a signaling interaction process between devices on a network is shown in FIG. 5 and includes:

Step 501: A switch 20 sends a packet-in message to a switch 60.

Because no control signaling transmission link exists between the switch 20 and a controller 10, the packet-in message needs to be sent to the switch 60, and then the switch 60 sends the packet-in message to the controller 10.

Step 502: The switch 60 forwards the packet-in message to a controller 10.

Step 503: The controller 10 generates a first packet that includes multiple flow entries and control instructions, and sends the first packet to the switch 60, so that the first packet is sent to a target switch 30 in a forwarding path by using the switch 60.

Step 504: After receiving the first packet, the switch 60 forwards the first packet to the switch 30.

Step 505: After receiving the first packet, the switch 30 parses the first packet to obtain a flow entry and a control instruction that correspond to an IP address of the switch 30, and stores the flow entry; and encapsulates remaining flow entries and control instructions of the switches 20 and 60 into a second packet, and sends the second packet to the switch 60.

Step 506: After receiving the second packet, the switch 60 identifies a flow entry corresponding to an IP address of the switch itself, encapsulates a remaining flow entry and control instruction of the switch 20 into a third packet, and sends the third packet to the switch 20.

After receiving the second packet, the switch 20 identifies and stores a flow entry corresponding to an IP address of the switch 20 itself, and then may forward to-be-forwarded data.

In this embodiment, because a control signaling transmission link does not exist between the switch 30 and the controller 10, the controller 10 may send the first packet to the switch 60 in step 503 so that the first packet is sent to the target switch 30 by using the switch 60.

Figure 6:
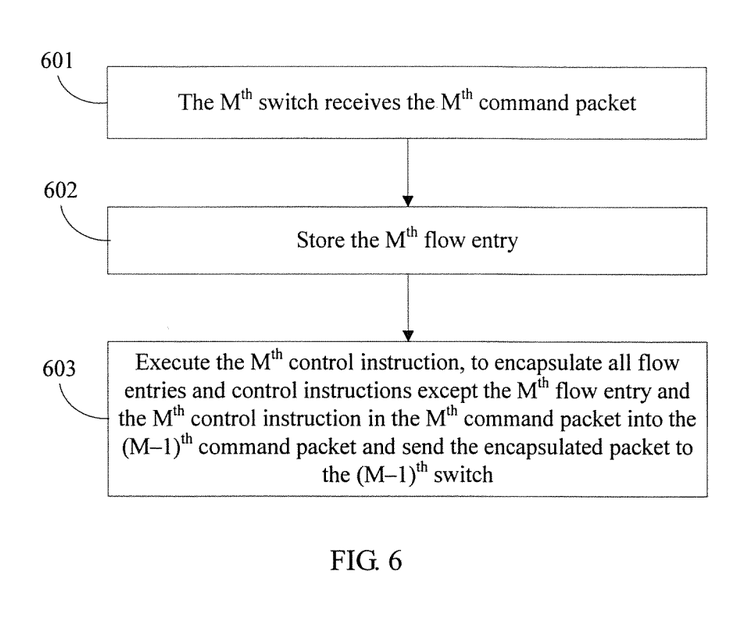
FIG. 6 is a flowchart of another flow entry delivery method embodiment according to this application.

Corresponding to the foregoing flow entry delivery method, another flow entry delivery method is disclosed in this application. An entity for performing this method is a switch in a forwarding path. FIG. 6 is a flowchart of another flow entry delivery method embodiment according to this application. As shown in FIG. 6, the method may include:

Step 601: The $N^{th}$ switch receives the $M^{th}$ command packet, where the $M^{th}$ command packet includes at least the $1^{st}$ to the $M^{th}$ flow entries that amount to M flow entries and the $2^{nd}$ to the $M^{th}$ control instructions that amount to M−1 control instructions, where the $M^{th}$ switch is the $M^{th}$-hop switch in a forwarding path, $1<M\le N$, the forwarding path is a path determined by a controller and used to forward to-be-forwarded data, the forwarding path includes N switches, a control instruction corresponding to the $M^{th}$ switch is the $M^{th}$ control instruction, and a flow entry corresponding to the $M^{th}$ switch is the $M^{th}$ flow entry.

Step 602: Store the $M^{th}$ flow entry.

Step 603: Execute the $M^{th}$ control instruction, to encapsulate all flow entries and control instructions except the $M^{th}$ flow entry and the $M^{th}$ control instruction in the $M^{th}$ command packet into the $(M-1)^{th}$ command packet and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

The forwarding path is a path determined by the controller and used to forward the to-be-forwarded data.

Figure 7:
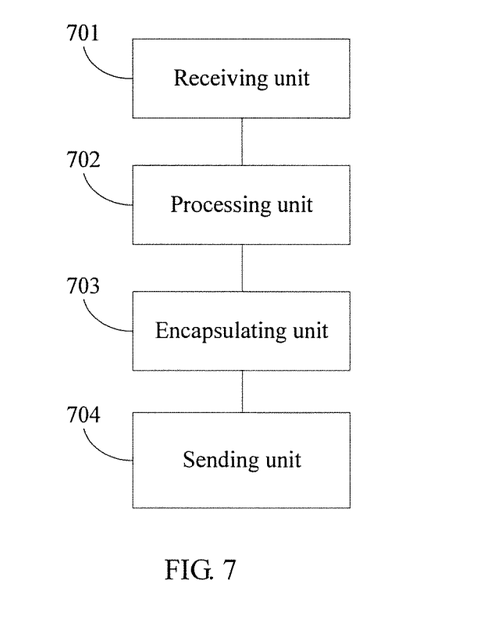
FIG. 7 is a structural diagram of a controller embodiment according to this application.

This application further discloses a controller. FIG. 7 is a structural diagram of a controller embodiment according to this application. As shown in FIG. 7, the controller may include:

a receiving unit 701, configured to receive a packet-in message sent by a source switch;

a processing unit 702, configured to determine a forwarding path according to the packet-in message, where the processing unit 702 is further configured to generate a corresponding flow entry for each of N switches in the forwarding path separately, where the $1^{st}$ switch in the N switches is the source switch, the $N^{th}$ switch is a target switch in the forwarding path, the $M^{th}$ switch is the $M^{th}$-hop switch in the forwarding path, $1<M\le N$, and a flow entry corresponding to the $M^{th}$ switch is the $M^{th}$ flow entry; and the processing unit 702 is further configured to generate a corresponding control instruction for each of other N−1 switches except the source switch in the forwarding path separately, where a control instruction corresponding to the $M^{th}$ switch is the $M^{th}$ control instruction;

an encapsulating unit 703, configured to encapsulate the generated N flow entries and N−1 control instructions into the $N^{th}$ command packet; and a sending unit 704, configured to send the $N^{th}$ command packet to the $N^{th}$ switch, where the $M^{th}$ control instruction in the $M^{th}$ command packet is used to instruct the $M^{th}$ switch to store the $M^{th}$ flow entry, encapsulate all flow entries and control instructions except the $M^{th}$ flow entry and the $M^{th}$ control instruction in the $M^{th}$ command packet into the $(M-1)^{th}$ command packet, and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

The controller in this embodiment can ensure that each switch has a flow entry corresponding to to-be-forwarded data when the to-be-forwarded data is forwarded, thereby preventing a corresponding device from sending a redundant message, even avoiding occurrence of a logic error, and preventing an error in a data forwarding process.

In practical application, the sending unit 704 may specifically include:

a first sending subunit, configured to: when a control signaling transmission link exists between the controller and the $N^{th}$ switch, send the $N^{th}$ command packet to a target switch by using the control signaling transmission link directly; and a second sending subunit, configured to: when the control signaling transmission link does not exist between the controller and the $N^{th}$ switch, send the $N^{th}$ command packet to the $N^{th}$ switch by using the source switch.

The processing unit 702 may specifically include:

a first determining subunit, configured to determine the $(M-1)^{th}$ switch;

a second determining subunit, configured to determine address information of the $(M-1)^{th}$ switch;

a third determining subunit, configured to determine a port used when the $M^{th}$ switch sends the $M^{th}$ command packet to the $(M-1)^{th}$ switch; and a first control instruction generating subunit, configured to generate the $M^{th}$ control instruction that includes the address information of the $(M-1)^{th}$ switch and information about the port, so that the $M^{th}$ switch encapsulates the address information of the $(M-1)^{th}$ switch into the $(M-1)^{th}$ command packet according to the $M^{th}$ control instruction and sends the $(M-1)^{th}$ command packet to the $(M-1)^{th}$ switch by using the port.

Figure 8:
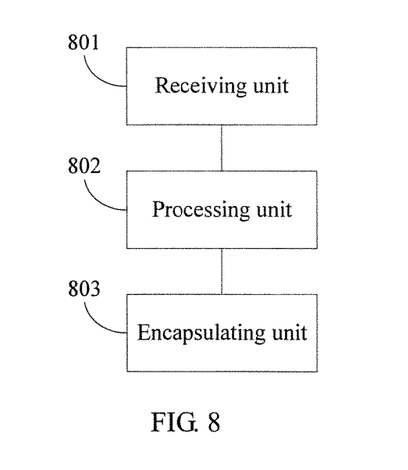
FIG. 8 is a structural diagram of a switch embodiment according to this application.

This application further discloses a switch. FIG. 8 is a structural diagram of a switch embodiment according to this application. As shown in FIG. 8, the switch may include:

a receiving unit 801, configured to receive the $M^{th}$ command packet, where the $M^{th}$ command packet includes at least the $1^{st}$ to the $M^{th}$ flow entries that amount to M flow entries and the $2^{nd}$ to the $M^{th}$ control instructions that amount to M−1 control instructions, where the switch is the $M^{th}$ switch, the $M^{th}$ switch is the $M^{th}$-hop switch in a forwarding path, $1<M\leq N$, the forwarding path is a path determined by a controller and used to forward to-be-forwarded data, the forwarding path includes N switches, a control instruction corresponding to the $M^{th}$ switch is the $M^{th}$ control instruction, and a flow entry corresponding to the $M^{th}$ switch is the $M^{th}$ flow entry;

a processing unit 802, configured to store the $M^{th}$ flow entry; and a sending unit 803, configured to execute the $M^{th}$ control instruction, to encapsulate all flow entries and control instructions except the $M^{th}$ flow entry and the $M^{th}$ control instruction in the $M^{th}$ command packet into the $(M-1)^{th}$ command packet and send the encapsulated packet to the $(M-1)^{th}$ switch, so that the switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

The forwarding path is a path determined by the controller and used to forward the to-be-forwarded data.

The switch in this embodiment can ensure that each switch has a flow entry corresponding to to-be-forwarded data when the to-be-forwarded data is forwarded, thereby preventing a corresponding device from sending a redundant message, even avoiding occurrence of a logic error, and preventing an error in a data forwarding process.

In practical application, the receiving unit 801 may specifically include:

a first receiving subunit, configured to: when the $M^{th}$ switch is a target switch in the forwarding path, receive the $M^{th}$ command packet sent by the controller; and a second receiving subunit, configured to: when the $M^{th}$ switch is not the target switch in the forwarding path, receive the $M^{th}$ packet sent by the $(M+1)^{th}$ switch, where the $(M+1)^{th}$ switch is a next-hop switch of the $M^{th}$ switch in the forwarding path.

In addition, an embodiment of this application further provides a computing node, where the computing node may be a host server that includes a computing capability, or a personal computer PC, or a portable computer or terminal, or the like. A specific embodiment of this application does not limit specific implementation of the computing node.

Figure 9:
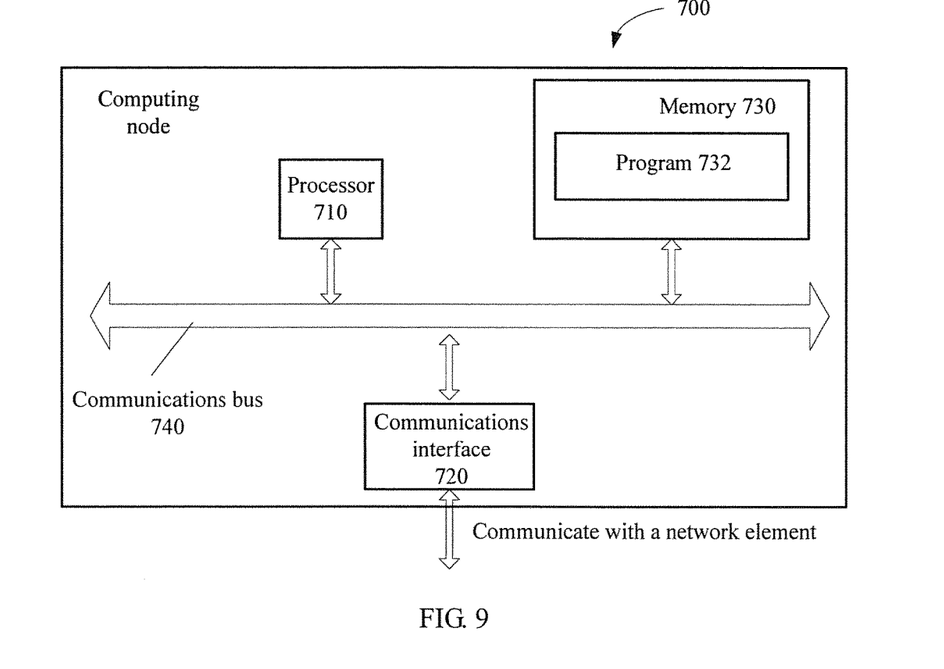
FIG. 9 is a structural diagram of a computing node according to this application.

FIG. 9 is a structural diagram of a computing node according to this application. As shown in FIG. 9, the computing node 700 includes:

a processor 710, a communications interface 720, a memory 730, and a bus 740.

The processor 710, the communications interface 720, and the memory 730 communicate with each other by using the bus 740.

The processor 710 is configured to execute a program 732.

Specifically, the program 732 may include program code, where the program code includes a computer operation instruction.

The processor 710 may be a central processing unit CPU, or an application-specific integrated circuit ASIC, or one or more integrated circuits configured to implement the embodiment of this application.

The memory 730 is configured to store the program 732. The memory 730 may include a high-speed RAM memory, and may further include a non-volatile memory such as at least one disk memory.

When the computing node runs, the processor 710 communicates with the memory 730, and the processor 710 executes the program 732 so that the computing node performs the following method:

receiving a packet-in message sent by a source switch;

determining a forwarding path according to the packet-in message;

generating a corresponding flow entry for each of N switches in the forwarding path separately, where the $1^{st}$ switch in the N switches is the source switch, the $N^{th}$ switch is a target switch in the forwarding path, the $M^{th}$ switch is the $M^{th}$-hop switch in the forwarding path, $1<M\leq N$, and a flow entry corresponding to the $M^{th}$ switch is the $M^{th}$ flow entry;

generating a corresponding control instruction for each of other N−1 switches except the source switch in the forwarding path separately, where a control instruction corresponding to the $M^{th}$ switch is the $M^{th}$ control instruction;

encapsulating the generated N flow entries and N−1 control instructions into the $N^{th}$ command packet; and sending the $N^{th}$ command packet to the $N^{th}$ switch, so that the $N^{th}$ switch transmits the N flow entries in the forwarding path according to the $N^{th}$ control instruction in the $N^{th}$ command packet, where the $M^{th}$ control instruction in the $M^{th}$ command packet is used to instruct the $M^{th}$ switch to store the $M^{th}$ flow entry, encapsulate all flow entries and control instructions except the $M^{th}$ flow entry and the $M^{th}$ control instruction in the $M^{th}$ command packet into the $(M-1)^{th}$ command packet, and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

Alternatively, the processor 710 executes the program 732 so that the computing node performs the following method:

receiving the $M^{th}$ command packet, where the $M^{th}$ command packet includes at least the $1^{st}$ to the $M^{th}$ flow entries that amount to M flow entries and the $2^{nd}$ to the $M^{th}$ control instructions that amount to M−1 control instructions, where the $M^{th}$ switch is the $M^{th}$-hop switch in a forwarding path, $1<M\leq N$, the forwarding path is a path determined by a controller and used to forward to-be-forwarded data, the forwarding path includes N switches, a control instruction corresponding to the $M^{th}$ switch is the $M^{th}$ control instruction, and a flow entry corresponding to the $M^{th}$ switch is the $M^{th}$ flow entry;

storing the $M^{th}$ flow entry; and executing the $M^{th}$ control instruction, to encapsulate all flow entries and control instructions except the $M^{th}$ flow entry and the $M^{th}$ control instruction in the $M^{th}$ command packet into the $(M-1)^{th}$ command packet and send the encapsulated packet to the $(M-1)^{th}$ switch, so that the $(M-1)^{th}$ switch transmits remaining M−1 flow entries in the forwarding path according to the $(M-1)^{th}$ control instruction in the $(M-1)^{th}$ command packet, where the $(M-1)^{th}$ switch is a previous-hop switch of the $M^{th}$ switch in the forwarding path.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

A person skilled in the art may be further aware that, in combination with the examples described in the embodiments disclosed in this specification, units and algorithm steps may be implemented by electronic hardware or a combination of electronic hardware and computer software. To clearly describe the interchangeability between some hardware and software, the foregoing has generally described compositions and steps of each example according to functions. Whether the functions are performed by hardware or a combination of software and hardware depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

What is claimed is:

1. A flow entry delivery method, wherein the method comprises:
   receiving, by a controller, a packet-in message sent by a source switch;
   determining, by the controller, a forwarding path according to the packet-in message;
   generating, by the controller, a corresponding flow entry for each of N switches in the forwarding path separately, wherein a first switch in the N switches is the source switch, an $N^{th}$ switch is a target switch in the forwarding path, an $M^{th}$ switch is an $M^{th}$-hop switch in the forwarding path, 1<M≤N, and a flow entry corresponding to the $M^{th}$ switch is an $M^{th}$ flow entry;
   generating, by the controller, a corresponding control instruction for each of other N−1 switches except the source switch in the forwarding path separately, wherein a control instruction corresponding to the $M^{th}$ switch is an $M^{th}$ control instruction;
   encapsulating, by the controller, the N flow entries and N−1 control instructions into an $N^{th}$ command packet; and
   sending, by the controller, the $N^{th}$ command packet to the $N^{th}$ switch, so that the $N^{th}$ switch transmits the N flow entries in the forwarding path according to an $N^{th}$ control instruction in the $N^{th}$ command packet, wherein the $M^{th}$ control instruction in an $M^{th}$ command packet is used to instruct the $M^{th}$ switch of the N switches to store the $M^{th}$ flow entry, encapsulate all flow entries and control instructions except the $M^{th}$ flow entry and the $M^{th}$ control instruction in the $M^{th}$ command packet into an $(M-1)^{th}$ command packet, and send the encapsulated packet to an $(M-1)^{th}$ switch, so that the $(M-1)^{th}$ switch transmits remaining M−1 flow entries in the forwarding path according to an $(M-1)^{th}$ control instruction in the $(M-1)^{th}$ command packet, wherein the $(M-1)^{th}$ switch is a previous-hop switch of the $M^{th}$ switch in the forwarding path.

2. The method according to claim 1, wherein sending the $N^{th}$ command packet to the $N^{th}$ switch comprises:
   sending, by the controller, the $N^{th}$ command packet to the $N^{th}$ switch by using a control signaling transmission link.

3. The method according to claim 1, wherein sending the $N^{th}$ command packet to the $N^{th}$ switch comprises:
   sending, by the controller, the $N^{th}$ command packet to the $N^{th}$ switch by using the source switch and the forwarding path when a control signaling transmission link does not exist between the controller and the $N^{th}$ switch.

4. The method according to claim 1, wherein generating the $M^{th}$ control instruction comprises:
   determining, by the controller, the $(M-1)^{th}$ switch, address information of the $(M-1)^{th}$ switch, and a port used when the $M^{th}$ switch sends the $M^{th}$ command packet to the $(M-1)^{th}$ switch; and
   generating, by the controller, the $M^{th}$ control instruction that comprises the address information of the $(M-1)^{th}$ switch and information about the port, so that the $M^{th}$ switch encapsulates the address information of the $(M-1)^{th}$ switch into the $(M-1)^{th}$ command packet according to the $M^{th}$ control instruction and sends the $(M-1)^{th}$ command packet to the $(M-1)^{th}$ switch by using the port.

5. A flow entry delivery method, wherein the method comprises:
   receiving, by an $M^{th}$ switch, an $M^{th}$ command packet, wherein the $M^{th}$ command packet comprises at least a first to an $M^{th}$ flow entries that amount to M flow entries and a second to an $M^{th}$ control instructions that amount to M−1 control instructions, wherein the $M^{th}$ switch is an $M^{th}$-hop switch in a forwarding path, 1<M≤N, the forwarding path is a path determined by a controller and used to forward to-be-forwarded data, the forwarding path comprises N switches, a control instruction corresponding to the $M^{th}$ switch is an $M^{th}$ control instruction, and a flow entry corresponding to the $M^{th}$ switch is the $M^{th}$ flow entry;
   storing, by the $M^{th}$ switch, the $M^{th}$ flow entry; and
   executing, by the $M^{th}$ switch, the $M^{th}$ control instruction, to encapsulate all flow entries and control instructions except the $M^{th}$ flow entry and the $M^{th}$ control instruction in the $M^{th}$ command packet into an $(M-1)^{th}$ command packet and send the encapsulated packet to an $(M-1)^{th}$ switch, so that the $(M-1)^{th}$ switch transmits remaining M−1 flow entries in the forwarding path according to an $(M-1)^{th}$ control instruction in the $(M-1)^{th}$ command packet, wherein the $(M-1)^{th}$ switch is a previous-hop switch of the $M^{th}$ switch in the forwarding path.

6. The method according to claim 5, wherein receiving the $M^{th}$ command packet comprises:
   receiving, by the $M^{th}$ switch, the $M^{th}$ command packet sent by the controller when the $M^{th}$ switch is a target switch in the forwarding path.

7. The method according to claim 5, wherein receiving the $M^{th}$ command packet comprises:
receiving, by the $M^{th}$ switch, the $M^{th}$ command packet sent by an $(M+1)^{th}$ switch when the $M^{th}$ switch is not a target switch in the forwarding path, wherein the $(M+1)^{th}$ switch is a next-hop switch of the $M^{th}$ switch in the forwarding path.

8. A communication system, comprising a controller and N switches, wherein:
the controller is configured to:
receive a packet-in message sent by a source switch of the N switches;
determine a forwarding path according to the packet-in message, wherein the forwarding path is a path used to forward to-be-forwarded data, the forwarding path comprises the N switches;
generate a corresponding flow entry for each of the N switches in the forwarding path separately, wherein a first switch in the N switches is the source switch, an $N^{th}$ switch is a target switch in the forwarding path, an $M^{th}$ switch is an $M^{th}$-hop switch in the forwarding path, $1<M\leq N$, and a flow entry corresponding to the $M^{th}$ switch is an $M^{th}$ flow entry;
generate a corresponding control instruction for each of other N−1 switches except the source switch in the forwarding path separately, wherein a control instruction corresponding to the $M^{th}$ switch is an $M^{th}$ control instruction;
encapsulate the N flow entries and N−1 control instructions into an $N^{th}$ command packet; and
send the $N^{th}$ command packet to the $N^{th}$ switch, so that the $N^{th}$ switch transmits the N flow entries in the forwarding path according to an $N^{th}$ control instruction in the $N^{th}$ command packet;
the $M^{th}$ switch of the N switches is configured to:
receive an $M^{th}$ command packet, wherein the $M^{th}$ command packet comprises at least a first to an $M^{th}$ flow entries that amount to M flow entries and a second to an $M^{th}$ control instructions that amount to M−1 control instructions, a control instruction corresponding to the $M^{th}$ switch is an $M^{th}$ control instruction, and a flow entry corresponding to the $M^{th}$ switch is an $M^{th}$ flow entry;
store the $M^{th}$ flow entry; and
execute the $M^{th}$ control instruction to encapsulate all flow entries and control instructions except the $M^{th}$ flow entry and the $M^{th}$ control instruction in the $M^{th}$ command packet into an $(M-1)^{th}$ command packet and send the encapsulated packet to an $(M-1)^{th}$ switch, so that the $(M-1)^{th}$ switch transmits remaining M−1 flow entries in the forwarding path according to an $(M-1)^{th}$ control instruction in the $(M-1)^{th}$ command packet, wherein the $(M-1)^{th}$ switch is a previous-hop switch of the $M^{th}$ switch in the forwarding path.

9. The communication system according to the claim 8, wherein the controller is configured to:
send the $N^{th}$ command packet to the $N^{th}$ switch directly by using a control signaling transmission link.

10. The communication system according to the claim 8, wherein the controller is configured to:
send the $N^{th}$ command packet to the $N^{th}$ switch by using the source switch and the forwarding path when a control signaling transmission link does not exist between the controller and the $N^{th}$ switch.

11. The communication system according to the claim 8, wherein the controller is configured to:
determine the $(M-1)^{th}$ switch, address information of the $(M-1)^{th}$ switch, and a port used when the $M^{th}$ switch sends the $M^{th}$ command packet to the $(M-1)^{th}$ switch; and
generate the $M^{th}$ control instruction that comprises the address information of the $(M-1)^{th}$ switch and information about the port, so that the $M^{th}$ switch encapsulates the address information of the $(M-1)^{th}$ switch into the $(M-1)^{th}$ command packet according to the $M^{th}$ control instruction and sends the $(M-1)^{th}$ command packet to the $(M-1)^{th}$ switch by using the port.

12. The communication system according to the claim 8, wherein the $M^{th}$ switch is configured to:
receive the $M^{th}$ command packet sent by the controller when the $M^{th}$ switch is a target switch in the forwarding path.

13. The communication system according to the claim 8, wherein the $M^{th}$ switch is configured to:
receive the $M^{th}$ command packet sent by the $(M+1)^{th}$ switch when the $M^{th}$ switch is not a target switch in the forwarding path, wherein the $(M+1)^{th}$ switch is a next-hop switch of the $M^{th}$ switch in the forwarding path.

* * * * *